Figure 1:
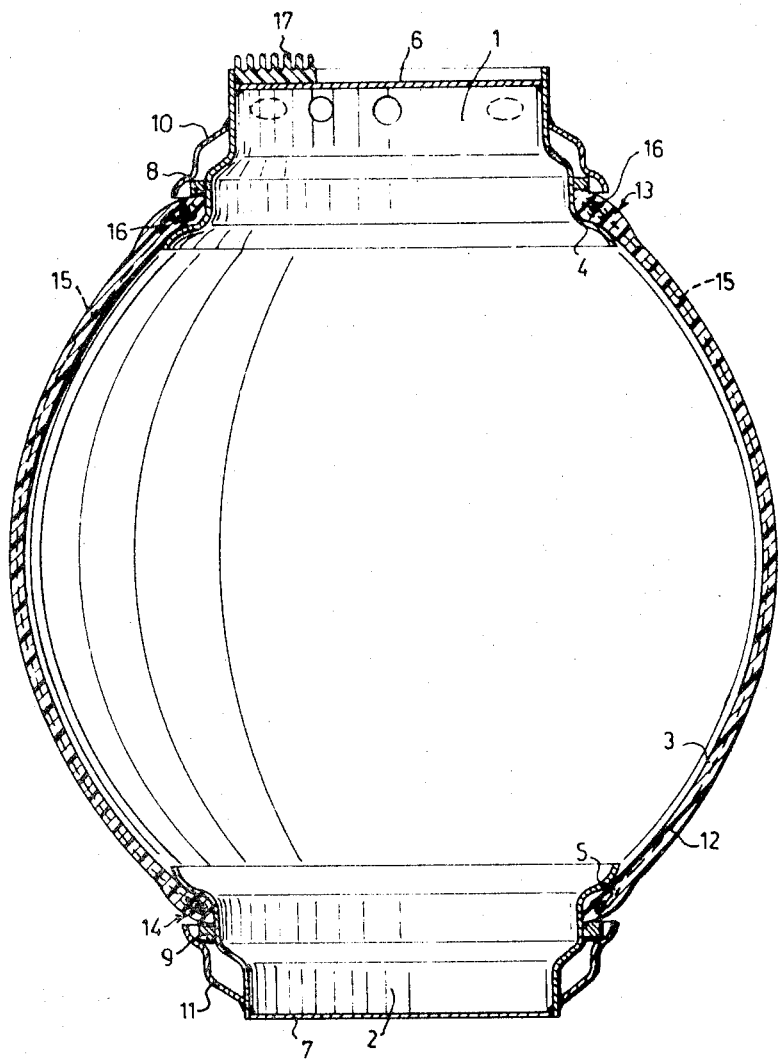

United States Patent Office 3,305,217
Patented Feb. 21, 1967

3,305,217
LIFTING JACK
Martien Wijgergangs, 9 Bosscheweg, Vught, Netherlands
Filed Feb. 2, 1965, Ser. No. 429,775
5 Claims. (Cl. 254—93)

This invention relates to a lifting jack and more particularly to a lifting jack for lifting motor vehicles for tire changing and similar purposes.

It is often necessary to lift an automobile body to change tires or for other purposes and various types of jacks have been developed including mechanical jacks operating on the frame of the car or on its bumper, hydraulic jacks in which liquids are pumped into cylinders raising the car and the like. These jacks have suffered from certain drawbacks. For example, jacks which are to be placed under the frame of an automobile must be very low because of the low ground clearance of modern cars. Also, they present problems because the element contacting the frame of the car is comparatively small and so, in many cases, is the jack base. This results in lack of steadiness particularly on uneven surfaces with the resulting danger that the vehicle may fall off the jack or the jack tip to let the vehicle down which presents a serious hazard for injury to persons changing tires or performing other operations underneath the vehicle.

Some of the above drawbacks have been partially solved by certain bumper jacks, either with a single leg or multiple legs such as tripod. The single leg jacks are also subject to the danger of tipping or unsteadiness on uneven surfaces and all bumper jacks require a very long lift because the initial movement merely permits the car springs to relax before tires are actually brought above the surface of the ground. Tripod bumper jacks do present much greater steadiness and when they are of the type utilizing a very long screw in one leg do not require excessive exertion. However, they are very heavy and long and present a problem of storage in the car trunk.

Certain automobiles have been designed with built-in jacks, usually hydraulic, or with supports in connection with the hydraulic system, as for example in the French Citroen automobiles. The latter still presents the problems of a small support base and possible tipping and the built-in jacks are very expensive and require a much more complicated design.

The present invention is a simple jack, which is sturdy, easily stored, practically nontippable and having an upper support surface contacting a frame of a vehicle which is large and flat and which presents a minimum chance of the vehicles slipping off the jack. Accordingly hazards to persons using the jack and performing operations under the vehicle are reduced to a minimum, and with practical care entirely eliminated. At the same time the jacks of the present invention can be used on quite soft ground in which small base jacks or supports are not useful.

The description of jacks which have been used before has been primarily in connection with jacks for automotive vehicles. However, the jack of the present invention can be used for lifting other objects and is in no sense intended to be limited to one designed only for the lifting of automotive vehicles. However, because of the great use of jacks in connection with automotive vehicles the present invention will be described in connection without however intending to limit it in any way to such use.

Essentially the jack of the present invention is composed of a large lower support area or surface and a large upper support joined by a reinforced flexible connection capable of pneumatic inflation. The jack may be considered as somewhat similar in design to a tubeless tire but with the wheel rim split in two, one forming the upper supporting surface and one the lower. In accordance with requirements for pneumatic sealing the form of the two half rims resembles somewhat the two sides of the rim for a tubeless tire to provide satisfactory sealing. There is of course provided an inflating valve which may be of a design similar to that for an ordinary automotive tire and of course it is provided with a suitable check valve to permit inflation. There is also provided means for letting out gas when the jack is to be deflated after use.

The flexible cylindrical connection between upper and lower supports, which resembles somewhat a tubeless tire, must be of material which is flexible and pliable but which does not substantially stretch when inflated. In other words, it must have the characteristics of a tire. In general, this is obtained by cords or fabrics embedded in a suitable elastic such as rubber, either natural or synthetic, polyurethane elastomers and the like. This material will be referred to in the claims as "substantially nonstretching, fiber reinforced, elastomer." It should be understood that this term is used in no other sense.

The jack of the present invention should not be confused with pneumatic jacks using stretchable air containers. A typical example of such a jack is described in Patent 1,909,890 in which a stretchable rubber bellows forms the lifting element and on deflation collapses in accordion pleats about wire reinforcements at the points where the pleats are to fold. The thin stretchable material presents the problem of accelerated wear in the collapsed form at the sharp folds of the accordion pleats. Also, when inflated it has no substantial lateral stability and requires metal side supports which do not bend sideways when the jack has been inflated. It will be noted that a much more complicated and heavier construction is required and that in the present invention the reinforced elastomer walls perform a dual function. They not only permit inflation but they are nonstretchable and, therefore, perform the additional function of side supports rigid in at least plane. Other lifting devices with stretchable air bags are known, typical examples being described in Patents 2,955,801 and 3,010,698. In each case metallic reinforcements are needed at the sides as in the case of the first jack referred to above.

The substantially nonstretching reinforced elastomer also has an additional advantage. When deflated it collapses in a single fold which does not have a sharp edge as the accordion pleats and which is of much larger diameter than the jack when inflated. This further property of the jack of the present invention not only prevents wear at sharp edges but it also performs an additional function when multiple jacks are used as will be described below.

While the fiber reinforced, elastomer walls of the present invention resemble a tubeless tire it should be noted that the amount of elastomer may be, and normally will be very much less because there is no need for thick thread for wear purposes and the width of the cylinder when extended is much greater than would be normal with a tire of similar diameter because, when inflated, the two upper and lower supports must be moved apart a distance sufficient to raise a vehicle or other object a desired amount. In the case of a jack to be used for a vehicle, this will be the difference between a deflated tire and a fully inflated tire, or rather slightly more as the vehicle must be raised sufficiently so that a fully inflated spare wheel can be mounted which requires a little clearance between the bottom of the spare and the ground.

The jack of the present invention not only has all of the advantages of lack of tipping, firm support for a vehicle, usability on soft ground which are drawbacks of ordinary jacks, but it is also cheap to construct and when deflated takes up comparatively little room. An additional advantage is that when a jack is used to raise a vehicle so that a wheel can be turned to determine vibrational balance there is no risk of the vehicle being jarred off the jack and the vibrations will be transferred to the balancing machine with greater reliability.

The jack of the present invention has been described generally in connection with vehicles which normally use only a single jack. It is however, also useful for multiple jack purposes as for jacking up a house to be moved or other larger objects. When multiple jacks of the present invention are used with an object, the weight of which is not uniformly distributed, there is a tendency for the heavier side to be raised less and, therefore, for the object to tip. The use of the present invention automatically incorporates a compensating feature. When the jack is deflated or partially deflated the diameter of the folded jacket is considerably larger than the diameter when inflated. The lifting force for a given air pressure is, of course, proportional to the square of the diameter and so there is a greater lifting force for the partially inflated jack than for one that is more inflated. This compensates to a considerable extent the tilt which may occur with a large object nonuniform weight distribution. It is, therefore, possible with the present invention to lift such an object with a smaller number of jacks all connected to air under the same pressure. This additional compensating effect is a result of the substantial nonstretchability of the elastomer jacket which makes it possible to fold without the external rigid supports at the folds which are otherwise necessary.

Figure 2:
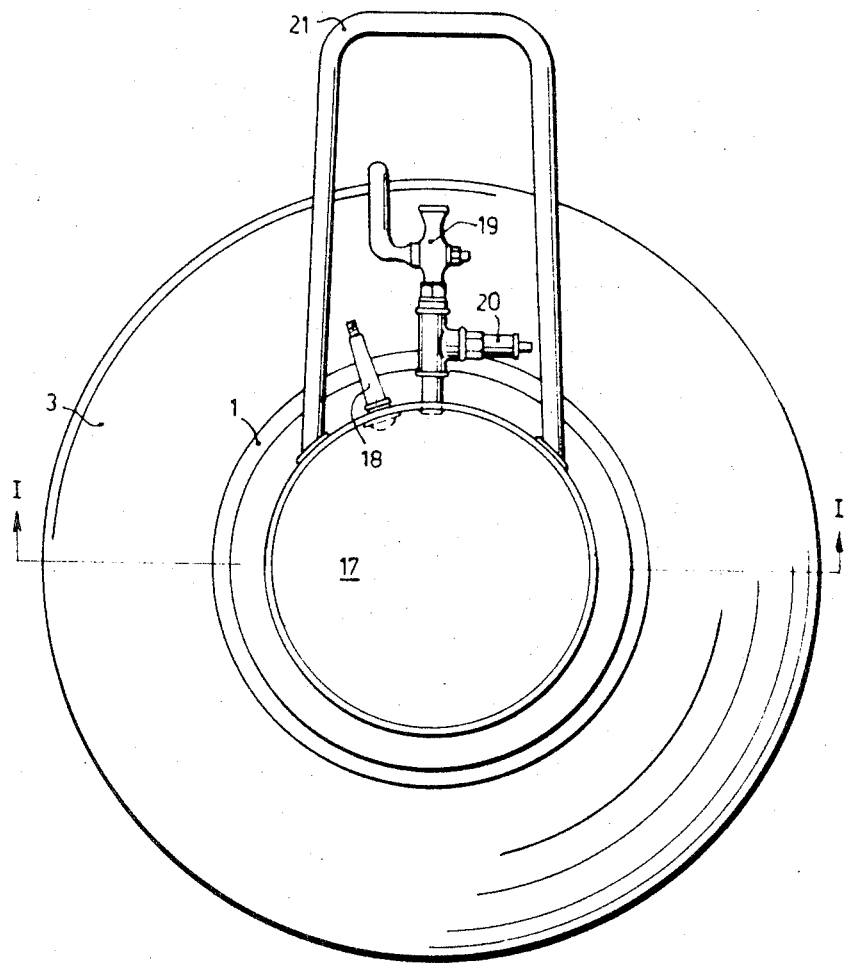

The invention will be described in greater detail in conjunction with the drawings in which:

FIG. 1 is a section along the line 1—1 of FIG. 2, and
FIG. 2 is a plan view of the jack.

The jack for lifting a motor vehicle shown in the drawing comprises an upper support 1, a bottom support 2 and a cylindrical jacket 3 constituting the means for connecting the upper support 1 vertically movable in respect with the bottom support 2, with which the jack is adapted to rest on the ground. The supports 1 and 2 are saucer-like in shape and, in the particular embodiment shown, are obtained at low costs by dividing a vehicle wheel rim adapted to be used for a tubeless tire, in two halves along a plane perpendicular to the wheel axis, in order to readily obtain a ring-shaped profiled sealing surface 4 at the surface facing away from the hollow inner side of the one half, forming the upper support 1 and also a ring-shaped, profiled sealing surface 5 at the surface facing away from the hollow inner side of the other half, forming the bottom support 2. The outer edge of a circular plate 6 has been welded circumferentially air tight to the inner surface of the central cylindrical portion of the upper support 1, leaving free a small strip of the inner surface of said cylindrical portion, and a circular plate 7 has been welded circumferentially air tight to the outer edge of the central cylindrical portions of the bottom support 2.

Clamp rings 8 and 9 are provided for clamping the upper- and lower marginal edges resp. of the jacket 3 sealingly against the sealing surfaces 4 and 5 resp. of the supports, by means of annular resilient clamping plates 10 and 11 resp., each being welded with its inner edge to the outer surfaces of the central cylindrical portion of the said supports. Said clamp rings 8 and 9 serve to avoid the possibility that the upper- and lower marginal edges of the jacket 3 should loosen partially or totally from the corresponding sealing surface of the supports 1 and 2 resp. in the inflated or retracted condition of the jacket 3.

The jacket 3 in this particular embodiment, consists of a tubeless tire 12, adapted to be used for the aforementioned wheel rim, the profiled tread portion of the tire being removed and being provided marginally with profiled heel portions 13 and 14, forming the upper- and lower marginal edges resp. of the jacket 3.

As usual several strengthening layers 15 of canvas or nylon cords are embedded in the rubber material of the tire 12, whereas several steel ring cords 16 surrounded by the turned back outer edge portions of said strengthening layers 15 are embedded in the rubber materials of the heel portions.

On assembling the various parts of the jack according to the present invention the upper support 1 and the bottom support 2 are positioned with their hollow inner side facing to each other, whereas the tire is turned inside out, so that the profiled sealing surfaces 4 and 5 at the outer surfaces of the supports 1 and 2 resp. are positioned opposite to the profiled sealing surfaces of the heel portions 13 and 14 resp. after which the rings 8 and 9 and clamping plates 10 and 11 are placed in position.

In order to obtain a protecting resilient supporting surface on the upper support 1, a thick rubber pad 17 is fixed into the cavity formed by the outer surface of the plate 6 and the annular inner surface of the outer edge portions of the central cylindrical portion.

The upper support 1 has also been provided with a check valve 18, in order to inflate the jacket 3 on connecting said valve with a hose (not shown) supplying air under pressure, the valve 18 being attached in a bore of the central cylindrical portion in a plane perpendicular to the rim axis, in which plane a hand operated tap 19 for discharging the air under pressure from the jacket 3 and preferably provided with a safety valve 20, has also been attached in a bore of said cylindrical portion. The said hose may be connected with its other end of a source of air under pressure consisting of a large pressure tank usually arranged in a petrol service station, but may also be connected to a small pressure cylinder containing air under pressure and to be stored in the storage space of a vehicle, in case the jack is used personally by the driver, whereas in the former case the jack is adapted to be used generally by the service man of said station.

The ends of a U-shaped metal strap 21 have been welded to the outer surface of said central cylindrical portion of the upper support 1, the strap extending around the valve 18, 20 and the tap 19 and being arranged in the same plane with said parts, to protect the same against damage and at the same time to provide a handle for the manipulation of the jack.

In practice a lifting jack of the described construction easily lifted a weight of three tons.

The jack of the present invention has been described in a simplified form in connection with the drawings which, for clarity, have not included all of the conventional or common features of a commercial garage jack, for example, a roller at the outside of the bottom support can be provided so that the jack when deflated can be easily rolled on a garage floor. Other common attachments may also be used. The present invention, of course, is directed to the jack itself with its nonstretching reinforced elastomer jacket and it is not intended that the invention be limited to the exact shapes of supports shown in the drawings.

I claim:
1. A jack comprising in combination,
   (a) rigid bottom and top supports of circular shape and provided at their peripheries with profiled sealing surfaces,
   (b) a cylindrical jacket of substantially non-stretching fiber reinforced elastomer forming with said top and bottom supports a tubeless tire shaped element, said jacket being capable of collapsing in a single fold of much larger diameter than that of the jacket when inflated,
   (c) the upper and lower edges of the cylindrical jacket being profiled in the form of tubeless tire beads, the profiles of the beads mating with the profiles of the sealing surfaces of the top and bottom support peripheries.

(d) mechanical means for pressing the beads of the upper and lower edges of the cylindrical jacket against the mating sealing surfaces of the support peripheries to form a substantially hermetic seal between the sealing surfaces of the support and the beads of the cylindrical jacket whereby the tubeless tire shaped element consists of rigid and substantially non-stretching fiber reinforced elastomer walls, and (e) means for inflating the tubeless tire shaped element and means for deflating it.

2. A jacket according to claim 1 in which the mechanical means for pressing the jacket beads against the mating sealing surfaces of the rigid top and bottom supports are in the form of clamp rings.

3. A jacket according to claim 2 having a non-slip resilient pad attached to the upper support surface.

4. A jack according to claim 2 provided with a handle extending beyond the circumference of the upper support for positioning the jack under a vehicle.

5. A jack according to claim 2 in which the beads are provided with peripherally inextensible metal inserts.

References Cited by the Examiner

UNITED STATES PATENTS

| | | | |
|---|---|---|---|
| 2,020,960 | 2/1937 | Phillips | 254—93 |
| 2,495,092 | 1/1950 | Cox et al. | 254—93 |
| 2,637,522 | 5/1953 | Wallace | 254—134 X |
| 2,804,118 | 8/1957 | Bayerkohler | 254—93 X |
| 2,955,801 | 10/1960 | Ploug | 254—93 X |

WILLIAM FELDMAN, *Primary Examiner.*

OTHELL M. SIMPSON, *Examiner.*